United States Patent
Pandolfo

[19]

[11] Patent Number: 6,146,526

[45] Date of Patent: Nov. 14, 2000

[54] VARIABLE RESONANCE DESCALING DECALCIFIER DEVICE CONNECTED TO A FORCED SEQUENTIAL REPHASING TRANSFORMER

[75] Inventor: Salvatore Mario Pandolfo, La Quercia, Italy

[73] Assignee: Instituto Analitico Tuscanese S.r.l., Tuscania, Italy

[21] Appl. No.: 08/998,642

[22] Filed: Dec. 29, 1997

Related U.S. Application Data

[62] Division of application No. 08/503,244, Jul. 17, 1995, Pat. No. 5,702,600.

[30] Foreign Application Priority Data

Mar. 14, 1995 [IT] Italy .................................. B095A0102

[51] Int. Cl.$^7$ ..................................................... C02F 1/48
[52] U.S. Cl. .......................... 210/222; 336/181; 336/182; 422/186.02
[58] Field of Search ..................................... 210/222, 695; 336/181, 182; 422/186.01, 186.02; 204/660

[56] References Cited

FOREIGN PATENT DOCUMENTS

92 A 000.007  1/1994  Italy .

*Primary Examiner*—Matthew O. Savage
*Attorney, Agent, or Firm*—Maurice M. Klee

[57] ABSTRACT

A variable resonance descaling decalcifier device for the treatment of hard, very hard and low hardness water is provided. The device works effectively and efficiently for line frequencies in the range between 30 hertz and 400 hertz. The device includes a resonator portion and a transformer portion. The resonator portion includes four coils ($L_1$, $L_{2-1}$, $L_{2-2}$, $L_3$) which surround a pipe (T) which carries the water to be treated. The transformer portion also includes four coils ($P_1$, $P_2$, $S_1$, $S_2$), wherein the two primary windings ($P_1$, $P_2$) are wound in opposite directions to one another and are connected to subtract their potential differential and the two secondary windings ($S_1$, $S_2$) are wound in the same manner but in opposition to the phase of the primary windings. In this way, enhanced tuning with the resonator portion of the decalcifier is achieved. The decalcifier successfully maintains minerals in solution for water undergoing a heat cycle and also inhibits the growth of algae and bacteria in water.

7 Claims, 6 Drawing Sheets ically, performance was substantially equal to 60 hertz.
VARIABLE RESONANCE DESCALING DECALCIFIER DEVICE CONNECTED TO A FORCED SEQUENTIAL REPHASING TRANSFORMER This is a divisional application of application U.S. Ser. No. 08/503,244 filed on Jul. 17, 1995 now U.S. Pat. No. 5,702,600.

FIELD OF THE INVENTION

This invention relates to water treatment devices and, in particular, to devices which reduce the formation of scale, including calcium-containing scale, on pipes, heat exchange surfaces, and the like. As used herein, such devices are referred to as "descaling decalcifier devices" or simply as "decalcifier devices."

BACKGROUND OF THE INVENTION

A variety of devices have been proposed for dealing with the problem of scale formation when mineral-containing water is subjected to a heat cycle, such as in a boiler, heat exchanger, cooling tower, or the like. Many of these devices have employed permanent magnetics mounted on the outside of a pipe which conducts the mineral-containing water. These devices form a fixed magnetic field in the area where they are located. This fixed magnetic field causes calcium to separate from the water to form aragonite crystals. Such crystals typically have a rough surface and thus can mechanically lock together to block narrow passages in the water system.

Italian patent application Ser. No. VT 92 A 000.07, filed Jul. 27, 1992, which was laid open for inspection between Jan. 27, 1994 and Feb. 25, 1994, discloses a water treatment system employing a piloted reluctance transformer connected to four coils which are wound around a metal pipe carrying the water which is to be treated. Unlike the devices employing permanent magnets, this device creates a varying magnetic field in the water passing through the pipe which interacts with calcium and other ions so as to reduce the tendency of such ions to precipitate within the system. The effect is most pronounced on calcium ions and, in many cases, can essentially completely prevent precipitation of these ions. This interaction between the varying magnetic field and the ions within the water also kills bacteria and inhibits the growth of algae.

Although the device of the above Italian patent application has been found to work successfully in practice, it has had a limitation in that its operation has been sensitive to the frequency of the supply current applied to the piloted reluctance transformer. In particular, the performance of the device drops off significantly when the frequency deviates from the design frequency by more than about ±5 hertz. The design frequency of the device of the Italian patent application was 50 hertz, and thus performance was significantly degraded outside of the range from about 45 hertz to about 55 hertz. In particular, performance was degraded at 60 hertz, the nominal line frequency in the United States and other countries.

SUMMARY OF THE INVENTION

In view of the foregoing, it is an object of the present invention to provide an improved water treatment device of the type disclosed in the above Italian application which is insensitive to the frequency of the line current used to power the device. In particular, it is an object of the invention to provide such a device which can work effectively with line currents having frequencies throughout the range from about 30 hertz to about 400 hertz, and, in particular, for a line current having a frequency substantially equal to 60 hertz.

It is a further object of the invention, to provide a water treatment device which is more effective than that disclosed in the above Italian patent application.

To achieve these goals, the invention provides a resonator/transformer combination which creates a time varying magnetic field capable of maintaining mineral ions in solution while at the same time being insensitive to the frequency of the power supplied to the transformer.

The resonator employs a diode and four coils, two of which are wound clockwise and two counterclockwise. The transformer also employs four coils, two of which are primary coils and two are secondary coils. The two primary windings are wound in opposite directions to one another and are connected to subtract their potential differential and the two secondary windings are wound in the same manner but in opposition to the phase of the primary windings. The arrangement of these various components is described below in detail. For ease of reference, the arrangement of the components and, in particular, of the transformer when connected to the resonator, is referred to herein as a "forced sequential rephasing" arrangement.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention. The drawings are not intended to indicate scale or relative proportions of the elements shown therein.

DETAILED DESCRIPTION OF THE INVENTION

As discussed above, the present invention relates to a variable resonance decalcifier device which comprises a resonator assembly which is formed by four coils and which is connected to a forced sequential rephasing transformer which is also formed by four coils. The forced sequential rephasing transformer feeds the resonator assembly and becomes an integral part of it to form the overall decalcifier device.

Figure 1:
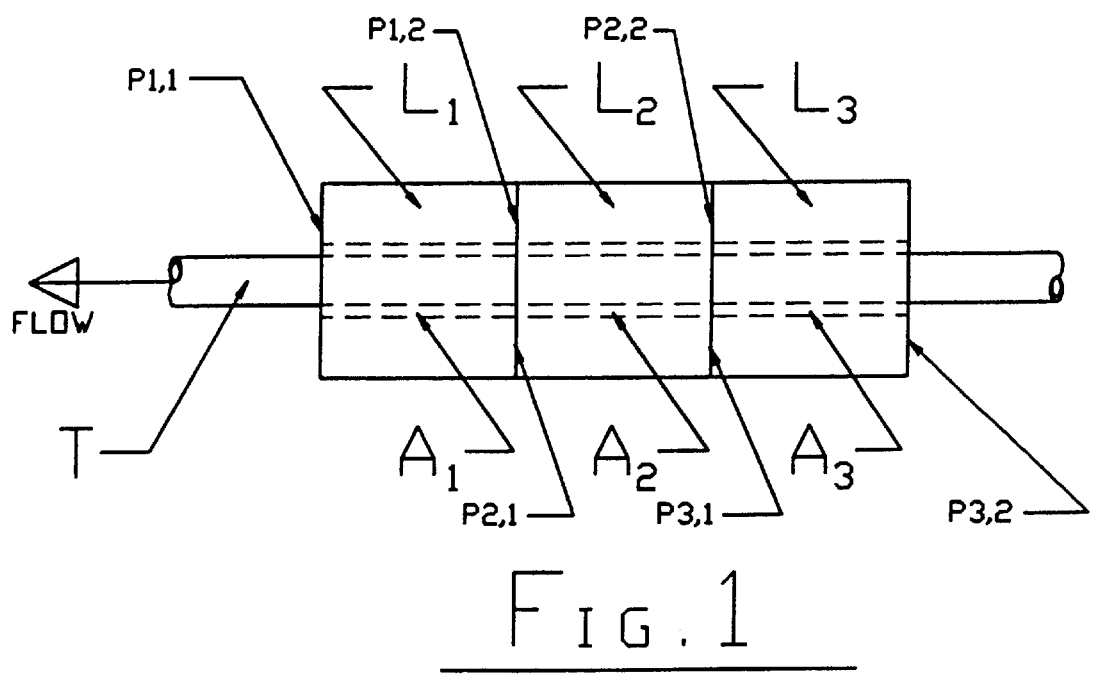
FIG. 1 is a schematic drawing of the overall structure of a resonator constructed in accordance with the invention.

As shown in FIG. 1, the resonator assembly includes three sections identified as $L_1$, $L_2$, and $L_3$. $L_1$ and $L_3$ each comprise a single coil wound on bobbins $A_1$ and $A_3$, respectively, while $L_2$ comprises two coils, i.e., $L_{2\text{-}1}$ and $L_{2\text{-}2}$ in FIG. 2, with $L_{2-1}$ being wound on bobbin $A_2$ and $L_{2-2}$ being wound on $L_{2-1}$. Bobbins $A_1$, $A_2$, and $A_3$, can be made of TEFLON or other materials as desired.

Bobbins $A_1$, $A_2$ and $A_3$ are co-axial with pipe T through which the water or other liquid being treated flows in a direction from right to left in FIG. 1. When the decalcifier is in operation, the flowing water in pipe T acts as a resonance core. The water flowing in the pipe can be potable or non-potable, and can have varying minerals dissolved therein. In particular, the water can be soft, hard, or very hard.

The pipe can be made of metallic materials, e.g., steel, or non-metallic materials, e.g., a PVC polymer. The pipe can have various diameters which generally will be in the range from about ⅛ inch to about 6 inches. The voltage which must be applied to the resonator by the transformer will vary with the diameter of the pipe. In particular, the voltage should increase from 7.5 volts to 41 volts as the pipe diameter increases from ⅛ inch to 6 inches.

Figure 2:
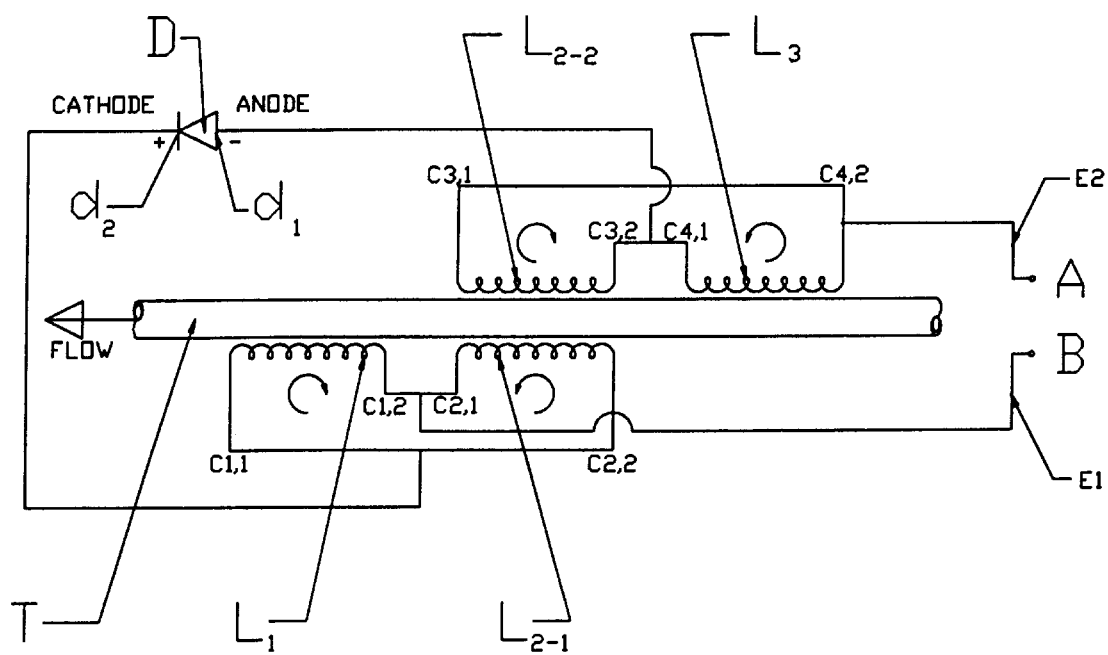
FIG. 2 is a circuit diagram for the resonator of FIG. 1.

FIG. 2 shows the electrical connections of the resonator portion of the decalcifier. The arrangement of components shown in this figure serves to optimize the resonances produced by coils $L_1$, $L_{2-1}$, $L_{2-2}$, and $L_3$. In general terms, terminals A and B feed the resonator with alternating current at low voltage which is provided by the secondary windings of the transformer portion of the decalcifier (see FIG. 6). Coils $L_1$ and $L_{2-1}$ are connected in series, as are coils $L_3$ and $L_{2-2}$. The coils are also connected during rephasing by a fast commutation rectifier diode D, which serves to dampen inversion peaks.

More particularly, the circuit of FIG. 2 comprises the following (see also FIG. 1):

(a) a first coil ($L_1$) for surrounding a first portion of the conduit, said first portion having a first end $p_{1,1}$ and a second end $p_{1,2}$, said first coil having a first end $c_{1,1}$ and a second end $c_{1,2}$, $c_{1,1}$ being in the region of $p_{1,1}$, and $c_{1,2}$ being in the region of $p_{1,2}$;

(b) a second coil ($L_{2-1}$) for surrounding a second portion of the conduit, said second portion having a first end $p_{2,1}$ which is adjacent to $p_{1,2}$ and a second end $p_{2,2}$, said second coil having a first end $c_{2,1}$ and a second end $c_{2,2}$, $c_{2,1}$ being in the region of $p_{2,1}$, and $c_{2,2}$ being in the region of $p_{2,2}$;

(c) a third coil ($L_{2-2}$) which surrounds the second coil ($L_{2-1}$), said third coil having a first end $c_{3,1}$ and a second end $c_{3,2}$, $c_{3,1}$ being in the region of $p_{2,1}$ and $c_{3,2}$ being in the region of $p_{2,2}$;

(d) a fourth coil ($L_3$) for surrounding a third portion of the conduit, said third portion having a first end $p_{3,1}$ which is adjacent to $p_{2,2}$ and a second end $p_{3,2}$, said fourth coil having a first end $c_{4,1}$ and a second end $c_{4,2}$, $c_{4,1}$ being in the region of $p_{3,1}$, and $c_{4,2}$ being in the region of $p_{3,2}$;

(e) a first electrical conductor $E_1$ and a second electrical conductor $E_2$ for providing alternating current power to the first, second, third, and fourth coils; and (f) a diode D having a negative anode end $d_1$ and a positive cathode end $d_2$;

wherein:

(A) $c_{1,2}$, $c_{2,1}$, and $E_1$ are electrically connected;

(B) $c_{3,1}$, $C_{4,2}$, and $E_2$ are electrically connected;

(C) $c_{3,2}$, $C_{4,1}$, and $d_1$ are electrically connected;

(D) $c_{1,1}$, $c_{2,2}$, and $d_2$ are electrically connected;

(E) the first ($L_1$) and third ($L_{2-2}$) coils are wound in a first winding direction;

(F) the second ($L_{2-1}$) and fourth ($L_3$) coils are wound in a second winding direction which is opposite to the first winding direction;

(G) liquid flows in a direction from the third portion to the first portion during use of the apparatus; and (H) the first winding direction is clockwise when looking from the third portion towards the first portion.

Coils $L_1$ and $L_3$ are single wound and made with 375 turns of wire having a diameter which increases from about 0.4 mm to about 3.65 mm as the diameter of pipe T increases from ⅛ inch to 6 inches. Coils $L_1$ and $L_3$ are wound in opposite directions.

Coils $L_{2-1}$ and $L_{2-2}$ are also wound in opposite directions. Each coil has 250 turns but $L_{2-2}$ contains more wire since it is wound on the outside of $L_{2-1}$ and thus has a larger diameter. The diameter of the wire used for coils $L_{2-1}$ and $L_{2-2}$ increases from about 0.4 mm to about 3.65 mm as the diameter of pipe T increases from ⅛ inch to 6 inches.

Diode D is preferably an ultrafast semiconductor diode having a switching time of less than about 35 nanoseconds.

Figure 3:
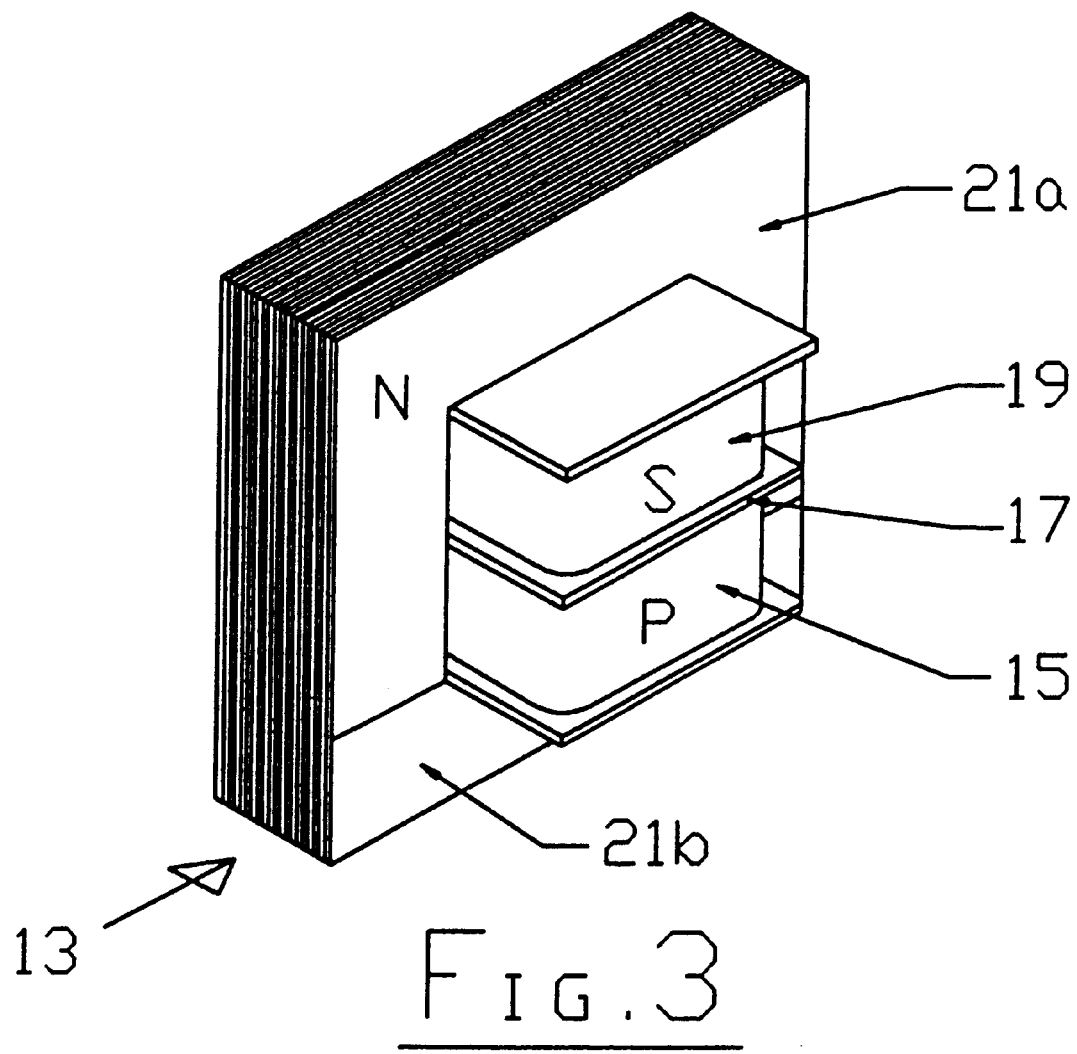
FIG. 3 is a perspective drawing of a transformer constructed in accordance with the invention.

FIG. 3 shows a perspective drawing of a feed transformer 13 for providing drive current to the resonator of FIG. 2. The transformer includes primary windings 15 which are physically separated from secondary windings 19 by insulator 17. The transformer also includes a laminated core N which is formed from core pieces 21a and 21b (see FIG. 5). The core can be made of conventional material such as a M6 steel. The core defines an axis L, and the primary and secondary coils and the insulator are arranged in order along this axis (see FIG. 4).

Transformer 13 includes two primary windings, with one winding wound in a clockwise direction and the other in a counter-clockwise direction, and two secondary windings, again with one winding wound in a clockwise direction and the other in a counter-clockwise direction. The primary windings are wound over each other as are the secondary windings so as to achieve a wiring and mechanical layout which is symmetrical and capable of achieving an optimum coordination of resonance with the coils of the resonator to which the transformer is connected. As discussed above, the primary and secondary windings are positively separated from each other by insulator 17 (see, for example, FIG. 4). The primary and secondary windings can be mounted on core N as bobbins which can be slid over the central portion of the core (see FIG. 5).

Figure 4:
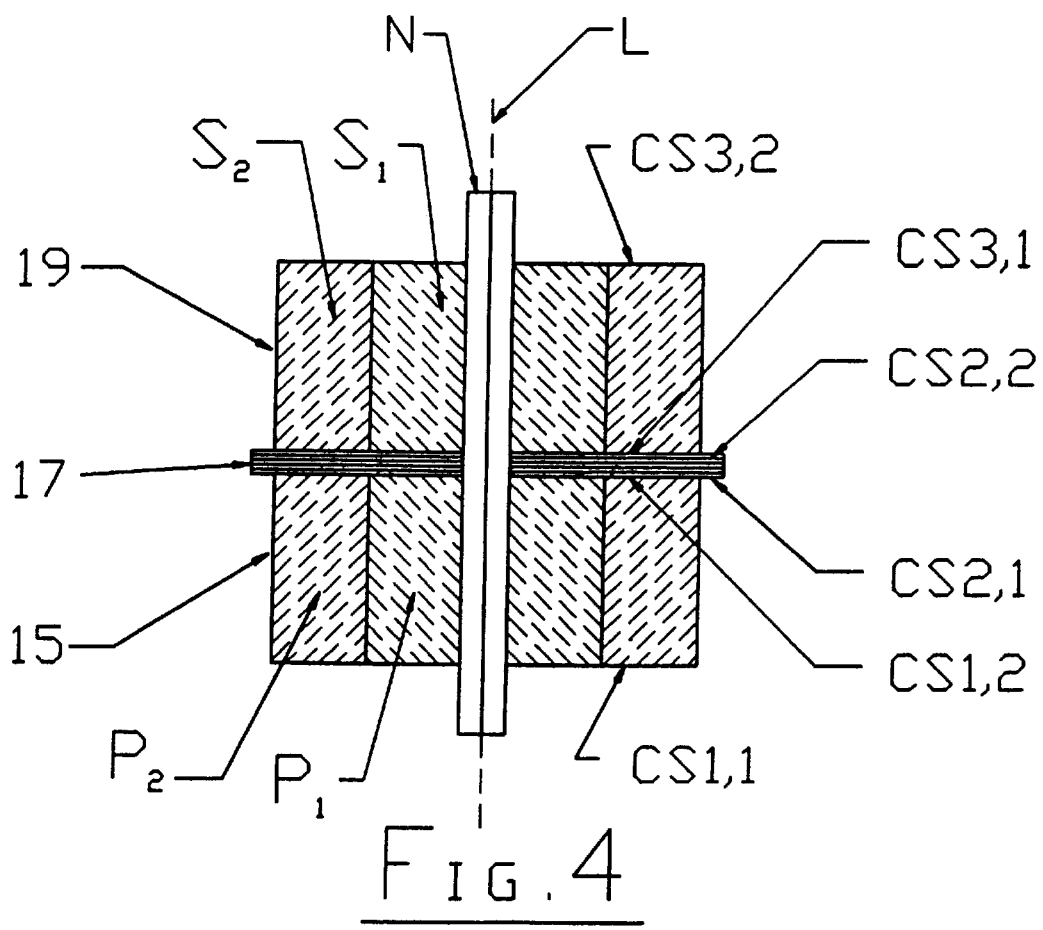
FIG. 4 is a schematic cross-sectional view of the transformer of FIG. 3.
Figure 5:
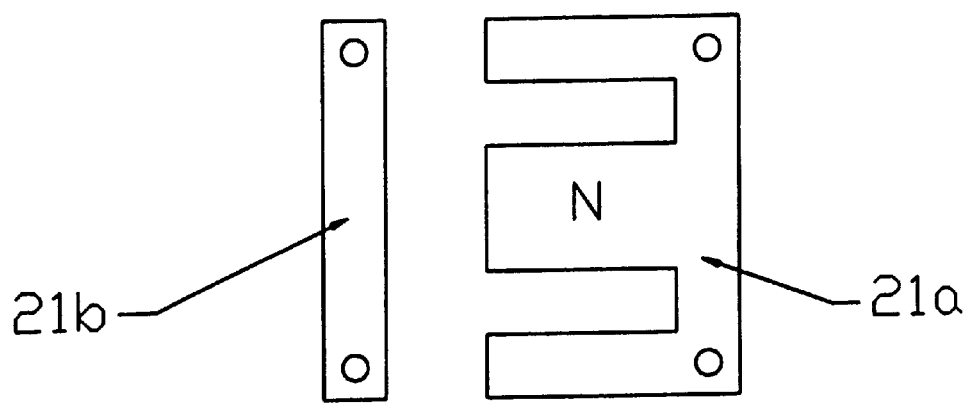
FIG. 5 is a schematic cross-sectional view of the core of the transformer of FIG. 3.
Figure 6:
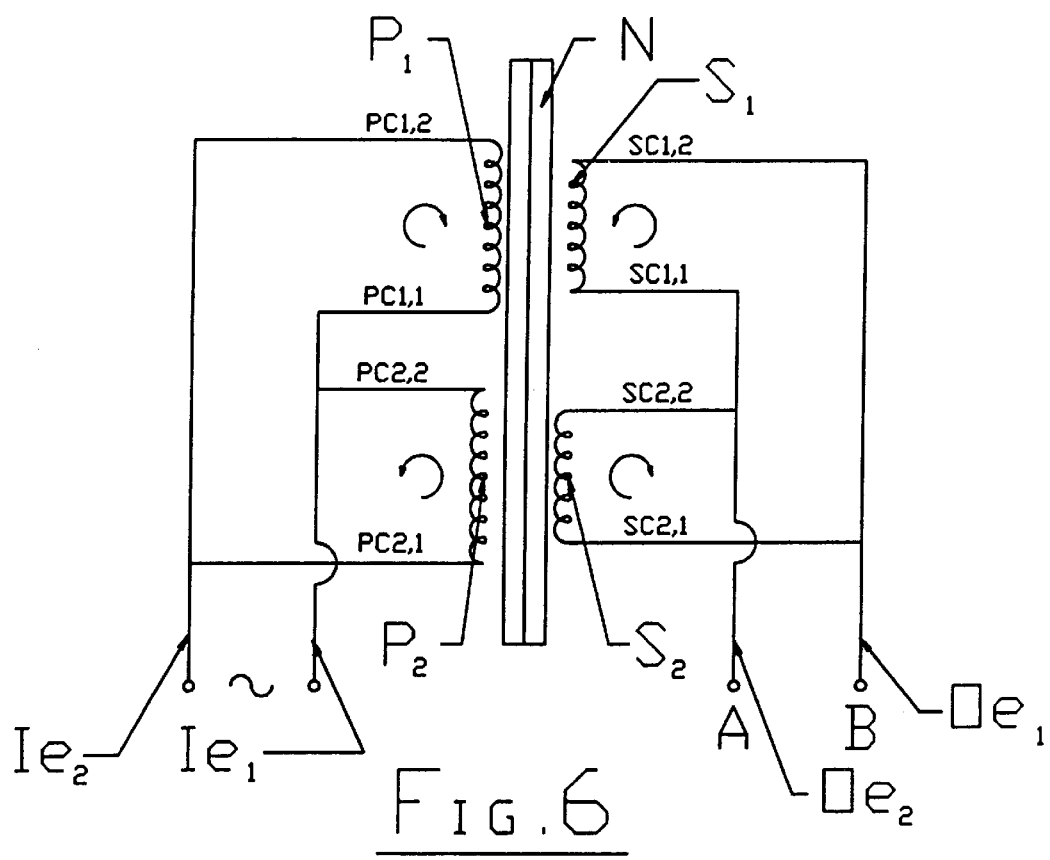
FIG. 6 is a circuit diagram for the transformer of FIG. 3.

FIG. 6 shows the electrical connections of the transformer portion of the decalcifier. That figure in combination with FIG. 4 shows that the transformer comprises:

(a) a core which defines an axis, said core having first, second, and third segments arranged in order along said axis, said first segment having a first end $cs_{1,1}$ and a second end $cs_{1,2}$, said second segment having a first end $cs_{2,1}$ adjacent to $cs_{1,2}$ and a second end $cs_{2,2}$ and said third segment having a first end $cs_{3,1}$ adjacent to $cs_{2,2}$, and a second end $cs_{3,2}$;

(b) a first primary coil which surrounds the first segment of the core, said first primary coil having a first end $pc_{1,1}$ and a second end $pc_{1,2}$, $pc_{1,1}$ being in the region of $cs_{1,1}$ and $pc_{1,2}$ being in the region of $cs_{1,2}$;

(c) a second primary coil which surrounds the first primary coil, said second primary coil having a first end $pc_{2,1}$ and a second end $pc_{2,2}$, $pc_{2,1}$ being in the region of $cs_{1,1}$ and $pc_{2,2}$ being in the region of $cs_{1,2}$;

(d) an insulator which surrounds the core and substantially fills the space between $cs_{2,1}$ and $cs_{2,2}$;

(e) a first secondary coil which surrounds the third segment of the core, said first secondary coil having a end $sc_{1,1}$ and a second end $sc_{1,2}$, $sc_{1,1}$ being in the region of $cs_{3,1}$ and $sc_{1,2}$ being in the region of $cs_{3,2}$;

(f) a second secondary coil which surrounds the first secondary coil, said second secondary coil having a first end $sc_{2,1}$ and a second end $sc_{2,2}$, $sc_{2,1}$ being in the region of $cs_{3,1}$ and $sc_{2,2}$ being in the region of $CS_{3,2}$;

(g) a first input electrical conductor $Ie_1$ and a second input electrical conductor $Ie_2$ for providing alternating current input power to the first and second primary coils; and (h) a first output electrical conductor $Oe_1$ and a second output electrical conductor $Oe_2$ for withdrawing alternating current output power from the first and second secondary coils;

wherein:

(A) $pc_{1,1}$, $pc_{2,2}$, and $Ie_1$ are electrically connected;

(B) $pc_{1,2}$, $pc_{2,1}$, and $Ie_2$ are electrically connected;

(C) $sc_{1,2}$, $sc_{2,1}$, and $Oe_1$ are electrically connected;

(D) $sc_{1,1}$, $sc_{2,2}$, and $Oe_2$ are electrically connected;

(E) the first primary coil and the second secondary coils are wound in a first winding direction; and (F) the second primary coil and first secondary coil are wound in a second winding direction which is opposite to the first winding direction.

When looking upward along axis L in FIG. 4, primary winding $P_1$ can be wound in a clockwise direction and primary winding $P_2$, which has the same number of turns as $P_1$, can be wound in a counter-clockwise direction. Also, secondary winding $S_2$, with the same number of turns as $S_1$, can be wound in a clockwise direction, while $S_1$ can wound in a counter-clockwise direction. The windings of the secondary $S_1$ and $S_2$ thus have the same wiring and mechanical schematic as the windings of the primary $P_1$ and $P_2$, but in opposite phase.

The number of turns used in the primary and secondary coils will depend upon the supply voltage, the cross-sectional area of the core, and the desired operating voltage of the resonator. The supply voltage can be in the range from 120 volts to 240 volts. The number of turns which are preferably used in the primary coils has been found to be given by the product of the supply voltage times 31 divided by the cross sectional area of the core in $cm^2$. For a core having a cross sectional area of 25 $cm^2$ and a line voltage of 120 volts, the number of turns used for both $P_1$ and $P_2$ is thus preferably 149. The number of turns used for the secondary coils is the product of the number of primary turns times the ratio of the desired secondary voltage to the line voltage. For a resonator which is to be driven at, for example, 12 volts, secondary coils $S_1$ and $S_2$ would then each have 15 turns when primary coils $P_1$ and $P_2$ each have 149 turns and the line voltage is 120 volts.

The size of the wire used for the primary and secondary coils will depend upon the size of the pipe T. In particular, the diameter of the wire used for the primary coils increases from about 0.35 mm to about 0.85 mm as the diameter of the pipe increases from 1/8 inch to 6 inches. Similarly, the diameter of the wire used for the secondary coils increases from about 0.5 mm to about 2.24 mm as the diameter of the pipe increases from 1/8 inch to 6 inches. The primary and secondary coils can be made of copper wire, which can also be used for the coils of the resonator portion of the decalcifier.

Although not shown in the figures, the transformer and the resonator will normally be connected by a cable. The cable can have a length in the range from about 3.5 meters to about 12.6 meters and preferably is a shielded cable with two conductors, each having a diameter which increases from about 1.0 mm to about 2.5 mm as the diameter of pipe T increases from 1/8 inch to 6 inches.

The foregoing description of the number of turns, wire diameters, etc. are applicable to decalcifiers for use with pipes having diameters in the 1/8 to 6 inch range. The specific values to be used for any particular diameter in this range can be readily determined by persons of ordinary skill in the art based on the disclosure herein. In particular, the values can be adjusted empirically so that minerals are maintained in solution while water is going through a heat cycle. In a similar manner, the invention can be applied to pipe sizes outside of the 1/8 to 6 inch range.

Transformers having the foregoing construction achieve a high level of tuned resonance with resonators having the construction illustrated in FIGS. 1 and 2 for line frequencies in the 30 hertz to 400 hertz range. The resonant behavior of the system is a function of the transformer, the resonator, and the composition of the liquid flowing through pipe T. The resonance which the system generates prevents the equilibrium between $Ca(HCO_3)_2$ and $CaCO_3+H_2O+CO_2$ from moving towards $CaCO_3+H_2O+CO_2$ which produces calcium deposits. In addition to effectively treating hard water, the system is also effective in abating pollutants such as bacteria and algae.

Among other advantages, the system of the invention allows considerable savings in industrial processes, e.g., the operation of cooling towers, water treatment plants, and the like. It also improves the operation of commercial laundries and reduces the amount of chlorine and other additives needed to abate the growth a bacteria and algae in potable water supplies.

Figure 7:
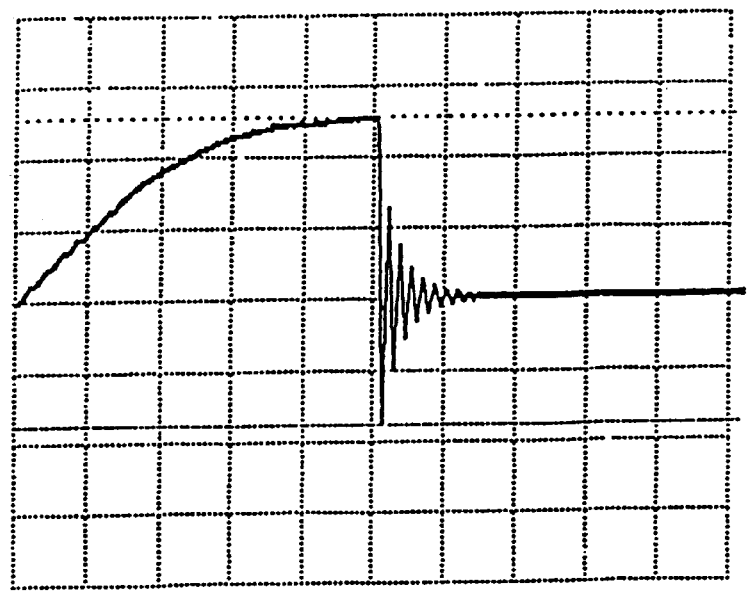
FIG. 7 is an oscilloscope tracing obtained from a pick-up coil located on the $L_1$ coil of the resonator of FIG. 1. Each vertical division in FIG. 7 represents one volt and each horizontal division represents one millisecond.

The system of the invention is about 30% more efficient than the system of the above-referenced Italian patent application. Specifically, if a pick-up coil is placed near coil $L_1$, the peak-to-peak height of the recorded time-varying waveform is generally about 30% greater than when the circuit of the Italian patent application is used. FIG. 7 shows a typical waveform as recorded from such a pick-up coil for a decalcifier constructed in accordance with the invention. Pipe T in this case had a diameter of three quarters of an inch.

Although specific embodiments of the invention have been described and illustrated, it is to be understood that modifications can be made without departing from the invention's spirit and scope. For example, the shapes and dimensions illustrated may change according to the requirements of specific applications, and the materials used may be replaced with other technically equivalent materials.

A variety of other modifications which do not depart from the scope and spirit of the invention will be evident to persons of ordinary skill in the art from the disclosure herein. The following claims are intended to cover the specific embodiments set forth herein as well as such modifications, variations, and equivalents.

What is claimed is:

1. Apparatus for treating a liquid flowing in a conduit comprising:

(A) a transformer comprising:

(1) a core, a first primary coil wound on the core, a second primary coil wound on the first primary coil, means for electrically connecting the first and second primary coils, a first secondary coil wound on the core, a second secondary coil wound on the first secondary coil, and means for electrically connecting the first and second secondary coils wherein:

(a) the first and second primary coils are connected in parallel;

(b) the first and second primary coils are wound in opposite directions so that their fluxes oppose;

(c) the first and second secondary coils are connected in parallel;

(d) the first and second secondary coils are wound in opposite directions;

(e) the first primary coil and the second secondary coil are wound in the same direction so that they have the same phase; and (f) the second primary coil and the first secondary coil are wound in the same direction so that they have the same phase;

(2) first and second input conductors for applying line current to the transformer;

(3) means for electrically connecting the first input conductor to the first and second primary coils;

(4) means for electrically connecting the second input conductor to the first and second primary coils;

(5) first and second output conductors for withdrawing output current from the transformer;

(6) means for electrically connecting the first output conductor to the first and second secondary coils; and (7) means for electrically connecting the second output conductor to the first and second secondary coils; and (B) a resonator which is applied to the conduit and comprises:

(1) a first coil, a second coil, a third coil, a fourth coil, means for electrically connecting the first and second coils to one another in series, and means for electrically connecting the third and fourth coils to one another in series, the first and third coils being wound in a first direction and the second and fourth coils being wound in a second direction;

(2) a diode for dampening inversion peaks during rephasing, said diode having a first end and a second end;

(3) means for electrically connecting the first end of the diode to the first and second coils; and (4) means for electrically connecting the second end of the diode to the third and fourth coils;

(C) first means for electrically connecting the first and second coils of the resonator to the first output conductor of the transformer; and (D) second means for electrically connecting the third and fourth coils of the resonator to the second output conductor of the transformer.

2. The apparatus of claim 1 wherein the transformer and the resonator achieve resonance for line current frequencies throughout a range from about 30 hertz to about 400 hertz.

3. The apparatus of claim 1 wherein the transformer and resonator achieve resonance for a line current frequency substantially equal to 60 hertz.

4. Apparatus for treating mineral-containing water flowing in a conduit comprising a transformer, a resonator which is applied to the conduit, means for electrically connecting the transformer to the resonator, and first and second input conductors for applying line current to the transformer, wherein:

(i) the transformer and the resonator achieve resonance for line current frequencies throughout a range from about 30 hertz to about 400 hertz so that the apparatus causes minerals in the water to be maintained in solution while the water is undergoing a heat cycle for a line current having a frequency in said range; and (ii) the transformer comprises a core, a first primary coil wound on the core, a second primary coil wound on the first primary coil, means for electrically connecting the first and second primary coils, a first secondary coil wound on the core, a second secondary coil wound on the first secondary coil, means for electrically connecting the first and second secondary coils, means for electrically connecting the first input conductor to the first and second primary coils, and means for electrically connecting the second input conductor to the first and second primary coils, wherein:

(a) the first and second primary coils are connected in parallel;

(b) the first and second primary coils are wound in opposite directions so that their fluxes oppose;

(c) the first and second secondary coils are connected in parallel;

(d) the first and second secondary coils are wound in opposite directions;

(e) the first primary coil and the second secondary coil are wound in the same direction so that they have the same phase; and (f) the second primary coil and the first secondary coil are wound in the same direction so that they have the same phase.

5. Apparatus for treating mineral-containing water flowing in a conduit comprising a transformer, a resonator which is applied to the conduit, means for electrically connecting the transformer to the resonator, and first and second input conductors for applying line current to the transformer, wherein:

(i) the transformer and the resonator achieve resonance for a line current frequency substantially equal to 60 hertz so that the apparatus causes minerals in the water to be maintained in solution while the water is undergoing a heat cycle for a line current having said frequency; and (ii) the transformer comprises a core, a first primary coil wound on the core, a second primary coil wound on the first primary coil, means for electrically connecting the first and second primary coils, a first secondary coil wound on the core, a second secondary coil wound on the first secondary coil, means for electrically connecting the first and second secondary coils, means for electrically connecting the first input conductor to the first and second primary coils, and means for electrically connecting the second input conductor to the first and second primary coils, wherein:

(a) the first and second primary coils are connected in parallel;

(b) the first and second primary coils are wound in opposite directions so that their fluxes oppose;

(c) the first and second secondary coils are connected in parallel;

(d) the first and second secondary coils are wound in opposite directions;

(e) the first primary coil and the second secondary coil are wound in the same direction so that they have the same phase; and (f) the second primary coil and the first secondary coil are wound in the same direction so that they have the same phase.

6. Apparatus for treating bacteria and/or algae containing water flowing in a conduit comprising a transformer, a resonator which is applied to the conduit, means for electrically connecting the transformer to the resonator, and first and second input conductors for applying line current to the transformer, wherein:

(i) the transformer and the resonator achieve resonance for line current frequencies throughout a range from about 30 hertz to about 400 hertz so that the apparatus causes the growth of bacteria and/or algae to be inhibited for a line current having a frequency in said range; and (ii) the transformer comprises a core, a first primary coil wound on the core, a second primary coil wound on the first primary coil, means for electrically connecting the first and second primary coils, a first secondary coil wound on the core, a second secondary coil wound on the first secondary coil, means for electrically connecting the first and second secondary coils, means for electrically connecting the first input conductor to the first and second primary coils, and means for electrically connecting the second input conductor to the first and second primary coils, wherein:

(a) the first and second primary coils are connected in parallel;
(b) the first and second primary coils are wound in opposite directions so that their fluxes oppose;
(c) the first and second secondary coils are connected in parallel;
(d) the first and second secondary coils are wound in opposite directions;
(e) the first primary coil and the second secondary coil are wound in the same direction so that they have the same phase; and
(f) the second primary coil and the first secondary coil are wound in the same direction so that they have the same phase.

7. Apparatus for treating bacteria and/or algae containing water flowing in a conduit comprising a transformer, a resonator which is applied to the conduit, means for electrically connecting the transformer to the resonator, and first and second input conductors for applying line current to the transformer, wherein:

(i) the transformer and the resonator achieve resonance for a line current frequency substantially equal to 60 hertz so that the apparatus causes the growth of bacteria and/or algae to be inhibited for a line current having said frequency; and (ii) the transformer comprises a core, a first primary coil wound on the core, a second primary coil wound on the first primary coil, means for electrically connecting the first and second primary coils, a first secondary coil wound on the core, a second secondary coil wound on the first secondary coil, means for electrically connecting the first and second secondary coils, means for electrically connecting the first input conductor to the first and second primary coils, and means for electrically connecting the second input conductor to the first and second primary coils, wherein:

(a) the first and second primary coils are connected in parallel;
(b) the first and second primary coils are wound in opposite directions so that their fluxes oppose;
(c) the first and second secondary coils are connected in parallel;
(d) the first and second secondary coils are wound in opposite directions;
(e) the first primary coil and the second secondary coil are wound in the same direction so that they have the same phase; and
(f) the second primary coil and the first secondary coil are wound in the same direction so that they have the same phase.

* * * * *